(12) United States Patent
Kaul

(10) Patent No.: US 10,430,249 B2
(45) Date of Patent: Oct. 1, 2019

(54) SUPPORTING QUALITY-OF-SERVICE FOR VIRTUAL MACHINES BASED ON OPERATIONAL EVENTS

(71) Applicant: Red Hat Israel, Ltd., Ra'anana (IL)

(72) Inventor: Yaniv Kaul, Ra'anana (IL)

(73) Assignee: Red Hat Israel, Ltd., Raanana (IL)

( * ) Notice: Subject to any disclaimer, the term of this patent is extended or adjusted under 35 U.S.C. 154(b) by 191 days.

(21) Appl. No.: 15/341,145

(22) Filed: Nov. 2, 2016

(65) Prior Publication Data
US 2018/0121247 A1 May 3, 2018

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01)

(58) Field of Classification Search
CPC .............. G06F 9/5077; G06F 9/45558; G06F 2009/45579
See application file for complete search history.

(56) References Cited

U.S. PATENT DOCUMENTS

| | | | |
|---|---|---|---|
| 7,660,887 B2 | 2/2010 | Reedy et al. | |
| 7,966,614 B2 | 6/2011 | Chodroff et al. | |
| 8,584,128 B1 | 11/2013 | Don et al. | |
| 8,767,535 B2 | 6/2014 | Uysal et al. | |
| 9,412,075 B2 | 8/2016 | Padala et al. | |
| 2009/0031307 A1* | 1/2009 | Chodroff | G06F 9/5077 718/100 |
| 2009/0265707 A1 | 10/2009 | Goodman et al. | |
| 2010/0192149 A1* | 7/2010 | Lathrop | G06F 1/3203 718/1 |
| 2011/0296019 A1* | 12/2011 | Ferris | G06F 9/45533 709/226 |
| 2013/0191543 A1* | 7/2013 | Abbondanzio | H04L 47/70 709/226 |
| 2013/0262680 A1* | 10/2013 | Gujarathi | G06F 9/5011 709/226 |
| 2014/0047437 A1* | 2/2014 | Wu | G06F 11/3442 718/1 |

(Continued)

OTHER PUBLICATIONS

Rodrigo N. Calheiros, et al., "Virtual Machine Provisioning Based on Analytical Performance and QoS in Cloud Computing Environments", 2011 International Conference on Parallel Processing, 10 pages.

(Continued)

*Primary Examiner* — James J Lee
(74) *Attorney, Agent, or Firm* — Lowenstein Sandler LLP

(57) ABSTRACT

An implementation of the disclosure provides a method. The method comprises identifying a quality-of-service level associated with a virtual machine (VM) executed by a processing device of a host machine. The quality-of-service level indicates an amount of resources of the host machine allocated to the VM. The processing device monitors interactions associated with the VM for an occurrence of an event. Responsive to identifying the occurrence of the event, it is determined that the event is associated with a change in the quality-of-service level for the VM. Thereupon, the VM is provided with additional resources in accordance with the change in the quality-of-service level.

20 Claims, 5 Drawing Sheets

(56) References Cited

U.S. PATENT DOCUMENTS

| | | | | |
|---|---|---|---|---|
| 2014/0173113 | A1 | 6/2014 | Vemuri et al. | |
| 2015/0067171 | A1* | 3/2015 | Yum | H04L 67/2809 709/226 |
| 2015/0127916 | A1* | 5/2015 | Kani | G06F 9/45558 711/153 |
| 2015/0143367 | A1* | 5/2015 | Jia | G06F 9/5088 718/1 |
| 2015/0363216 | A1* | 12/2015 | Sampathkumar | G06F 9/45558 718/1 |
| 2016/0092251 | A1* | 3/2016 | Wagner | G06F 9/45533 718/1 |
| 2016/0196157 | A1* | 7/2016 | Kodama | G06F 9/45558 718/1 |
| 2016/0350173 | A1* | 12/2016 | Ahad | G06F 11/3495 |
| 2017/0063722 | A1* | 3/2017 | Cropper | G06F 16/285 |

OTHER PUBLICATIONS

Michael Boniface, et al., "Platform-as-a-Service Architecture for Real-time Quality of Service Management in Clouds", IT Innovation Centre, University of Southhampton, Southampton, UK; Telecommunications Laboratory National Technical University Athens, Athens, Greece; 2010, 6 pages.

Jim (Zhanwen) Li, et al., "Performance Model Driven QoS Guarantees and Optimization in Clouds", Dept. of Systems and Computer Engineering, Carleton University, Ottawa, Canada; School of Information Technology, York University, Toronto; IBM CAS Toronto, 8 pages.

* cited by examiner

SUPPORTING QUALITY-OF-SERVICE FOR VIRTUAL MACHINES BASED ON OPERATIONAL EVENTS

TECHNICAL FIELD

The disclosure is generally related to virtualized computer systems, and is more specifically related to supporting quality-of-service for virtual machines based on operational events.

BACKGROUND

A virtual machine (VM) is a portion of software that, when executed on hardware of a host computer system (also referred to as "host" or "host machine"), creates an environment allowing the virtualization of the host computer system. Virtualization permits multiplexing of the hardware of the underlying host computer between different VMs. The host computer system allocates a certain amount of its resources to each of the VMs. Each VM then can use the allocated resources to execute applications, including operating systems (referred to as guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the VM transparent to the guest OS and the user of the VM.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure describe supporting quality-of-service for virtual machines (VMs) based on events. "Quality of Service" (QoS) herein refers to a quantifiable measure of service (e.g., resources) being provided to different applications, users, data flow, and other types of components of a system. This measure of service may be in terms of, for example, a maximum or minimum delay in network bandwidth, memory and processing resources, a committed minimum amount of resources, or a limited maximum allocation of resources and other type of performance-related services associated with the system.

QoS is relevant to the ability of the system to efficiently provide critical resources to applications as well as support ever-increasing service demands. In order to provide a particular level of QoS to VMs, some virtualization systems reserve a certain amount of resources (e.g., CPU or I/O shares) based on predetermined settings. These predetermined settings, however, can be restrictive and do not reflect variations in the performance of the VMs or sporadic high demand resource requests of the applications running therein.

Implementations of the disclosure provide methods and systems to configure QoS for VMs based on certain operational events. In some implementations, these operational events may be manual events or scheduled reoccurring system events. An advantage of the disclosure is that it may increase the speed and efficiency of a virtualization environment during certain resource intensive events, such as at startup time of applications. In one implementation, an apparatus associated with a host machine maintains an updatable list of various events and anticipated QoS changes for such events (e.g., increase/decrease in CPU and I/O shares). The apparatus monitors interactions with a VM and determines, based on these interactions, whether one of the events in the list is taking place.

If an event from the list of events is taking place, the apparatus evaluates the QoS change specified for this event in the list to determine whether the current resources of the host machine allow for such a change. If the current resources can satisfy the QoS change, the apparatus adjusts the QoS for the VM implementing the specified change (e.g., increase in CPU, memory or I/O shares as specified in the list). If there is a shortfall of available resources on the host machine, the apparatus may determine what QoS changes can be allowed in view of the current resources of the host machine and adjust the QoS for the VM accordingly. This change in the QoS for the VM can be applied for a limited time, such as for the duration of the event. Thereafter, the apparatus may adjust the QoS of the VM back to its previous (e.g., normal) operational level.

Figure 1:
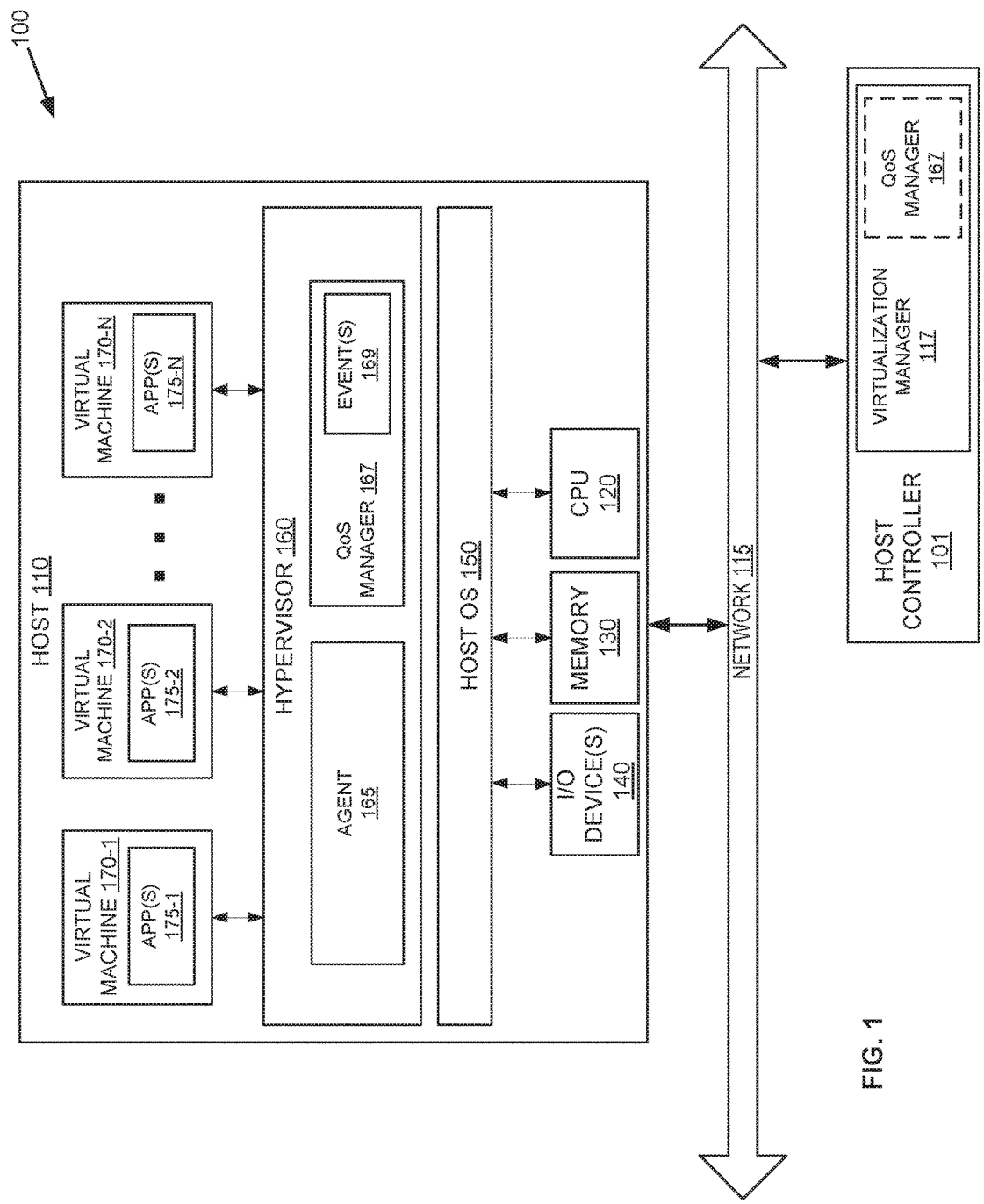
FIG. 1 depicts a block diagram of an example of a virtualization environment for supporting quality-of-service for virtual machines based on operational events in accordance with one or more aspects of the disclosure.

FIG. 1 depicts a block diagram of an example virtualization architecture 100 for supporting QoS for VMs based on operational events in accordance with one or more aspects of the disclosure. Other architectures for the virtualization architecture 100 are possible for implementing the techniques of the disclosure and are not necessarily limited to the specific architecture 100 depicted by FIG. 1.

As shown in FIG. 1, the virtualization architecture 100 includes a host controller 101 coupled to one or more host machines, such as host machine 110 (also referred to herein as "host"), over a network 115. The network 115 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Host machine 110 may be an independent machine that includes one or more computing devices (such as a rack-mount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The host machine 110 can include hardware components, such as one or more physical central processing units (CPU) 120 (also referred to as "processors" or processing devices"), memory (such as random access memory (RAM)) 130, input/output (I/O) devices 140, and other hardware components, which may all be communicably coupled via a system bus (not shown).

"Processor" or "CPU" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). As mentioned above, a processor may also be referred to as a CPU. "Memory" or "memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In one implementation, the host machine 110 may be communicably coupled to the host controller 101 via network 115. The host controller 101 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The host controller 101 may reside on a designated computer device(s) or be part of the host machine 110, or another machine.

In one implementation, the host controller 101 may include a virtualization manager 117 to manage the allocation of resources associated with the one or more host machines. In one implementation, the host controller 101 and host machine 110 may be part of a virtualization system. Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple VMs in order to improve the hardware utilization rate. In some implementations, virtualization manager 117 may manage the provisioning of a new VM, connection protocols between clients and VMs, user sessions (e.g., user authentication and verification, etc.), backup and restore, image management, VM migration, load balancing, and so on. The virtualization manager 117 may add a VM, delete a VM, balance the load on the host cluster, provide directory service to the VMs, and/or perform other management functions.

As part of the virtualization system, the host machine 110 can run an operating system 150 ("host OS") to manage its resources (e.g., CPU 120, memory 130, I/O device(s) 140, etc.), and a hypervisor 160 to support one or more VMs 170-1 through N. The hypervisor 160 may present to the VMs (170-1-N) an abstraction of the physical layer (i.e., hardware components) of host machine 110, including CPU 120, memory 130, and I/O devices 140, to the VMs (170-1-N), as virtual devices. Device virtualization may be implemented by intercepting VM memory read/write and/or input/output (I/O) operations with respect to certain memory and/or I/O port ranges, and by routing hardware interrupts to each VM associated with the corresponding virtual device. The hypervisor 160 may provide interfaces between the underlying hardware and virtual devices of each of VM.

The hypervisor 160 may also be known as a virtual machine monitor (VMM) or a kernel-based hypervisor. Hypervisor 160 may take many forms. For example, hypervisor 160 may be part of or incorporated in the host OS 150, or hypervisor 160 may be running on top of host OS 150. Alternatively, hypervisor 160 may a "bare metal" hypervisor that runs on hardware of host machine 110 without an intervening operating system. Some examples of hypervisors include quick emulator (QEMU), kernel mode virtual machine (KVM), virtual machine monitor (VMM), etc.

One or more applications, such as APPs 175-1 through N, may be executed under a guest OS (not shown) running on each of the VMs (170-1-N). Each VM may be associated with a QoS indicating a level of service/resources of the host machine 110 that is provided to each VM to support the different APPs (175-1-N). For example, the QoS may indicate a certain amount of resources (e.g., CPU 120, memory 130, I/O 140, etc.) of the host machine 110 that is allocated to the VM for use in executing the applications. In some implementations, the guest OS of each VM 170-1-N may access the underlying host machine resources by utilizing one or more virtual devices, such as virtual central processing units (vCPUs), virtual memory, and virtual I/O devices, as presented by the hypervisor 160.

In some implementations, the hypervisor 160 may execute an agent 165 or another type of process that monitors the status of devices associated with the VMs (170-1-N) running on the host machine 110. In alternative implementations, the agent 165 may be running on each of VMs (170-1-N) and is in communication with the hypervisor 160. In one implementation, the agent 165 can monitor a runtime status of the VMs (170-1-N), hardware configuration of devices, network and storage connectivity on the host machine 110, and similar VM-related and host-related information. The agent 165 may store this information for later use. For example, agent 165 may save this information in a local memory space to the host machine 110. Alternatively, agent 165 may save the information to a data store (not shown) accessible by the hypervisor 160.

Some applications, such as Apps 175-1-N, however, may execute processes at certain times that are in high-demand of resources than other processes running on the VM. For example, when a user initiates a start or boot-up of certain applications, the applications may be in high demand for both CPU and I/O for a temporary period of time, which then levels off and/or decreases after that period of time. During the time of high demand, the application may want to use more resources than are allocated to the VM 170-1-N at its regular QoS in order to perform efficiently and to not adversely affect the execution of the application.

To provide flexible QoS to the VMs to support the applications of the VMs, the system 100 may include a QoS manager 167. In some implementations, the hypervisor 140 may include QoS manager 167. In other implementations, a part or all of QoS manager 167 may be running at the host controller 101. For example, the virtualization manager 117 may include or be in communication with the QoS manager 167. The QoS manager 167 may provide an adaptable QoS for the applications executed by the VMs (170-1-N) at particular peak times. The QoS indicates an amount of resources (e.g., a minimum or maximum amount) of the host machine 110 that have been allocated for use by a VM 170-1-N. For example, the QoS may be based on a service level agreement or application subscription service associated with a user utilizing the application running on the VM. The QoS manager 167 can exist in a fewer or greater number of modules than what is shown, with such modules residing at one or more processing devices of virtualization architecture 100, which may be geographically dispersed.

In some implementations, the QoS manager 167 may monitor the VMs (170-1-N) for interactions that may cause a particular event to occur. This may indicate that a change in the QoS for the VMs should be established to support the event. In some implementations, the QoS manager 167 stores (e.g., in a local memory space or data store) an updatable list of events 169 indicating one or more operational event(s) associated one or more processes executing at the VMs 170-1-N. These events 169 may include, for example, manual (e.g., user-triggered, etc.) events, scheduled system events (e.g., system scheduled debugger or maintenance event), as well as other type of operational events that affect the QoS of the VMs. The events 169 may occur at an application level, machine level, network level, etc.

The QoS manager 167 may determine whether a particular event is to occur in view of the interaction with a given VM 170-1-N. In one implementation, the QoS manager 167 may identify the type of interaction associated with the VM 170-1-N and a corresponding event to occur based on that interaction. These types of interactions may include, for example, a start of an application at the VM 170-1-N, such as logging onto a desktop associated with VM and a subsequent shut down of the desktop, executing a high resource intensive process at the VM 170-1-N as well as other types of user-based interactions with the VM 170-1-N. In other implementations, the interactions may include a system maintenance or network scanning process (e.g., a monthly virus scan) that is to be executed at the VM 170-1-N, for example, by a system scheduler (not shown) associated with host machine 110.

The QoS manager 167 may determine whether the event identified by the interaction corresponds to one of the events in the list 169 stored by the hypervisor 160. In some implementations, the QoS manager 167 may identify a time period in which the event is to occur. For example, the QoS manager 167 may identify that the event is to occur at a particular time after being initiated (e.g., at start of an application), or that the event is scheduled to occur at a particular time. The QoS manager 167 may also identify how long the event may last and the amount of resources used by the event based on a previous occurrence of the events in the list 169. In one implementation, this timing information may be stored with the events along with other relevant information in the list 169.

Responsive to detecting that the event associated with the monitored VM interaction is on the list, the QoS manager 167 may instruct the hypervisor 160 to adjust the allocated resources of the VM 170-1-N for which the event is to occur in accordance with a change in the QoS associated with the event. For example, some events may be correspond to a high-demand of resources that may affect the normal performance level of the VM 170-1-N. In this regard, the QoS adjustments may include increasing or decreasing a certain percentage of the amount of resources available for the VM to use during the event to accommodate for the change in the QoS. For example, the QoS manager 167 may provide a VM with a 20% increase in network bandwidth or CPU at a time every day that a particular application is to start-up or execute at the VM. When the event is complete, the QoS manager 167 may instruct the hypervisor 160 to reverse the adjustment to return the VM to its regular QoS.

To determine whether there are available resources to satisfy the change in the QoS, the QoS manager 167 may receive information from the agent 165 regarding the status of resources running on the host machine 110. For example, the agent 165 monitors a runtime status of hardware and software components of the host machine 110, network and storage connectivity on the host machine 110, as well as other host machine-related information. Based on the information from the agent 165, the QoS manager 167 may determine that there are available resources to satisfy the change in the QoS for the VM. In some implementations, these resources may include resources other than and, in some cases, additional to the resources already allocated to the VM 170-1-N. As noted above, the VM 170-1-N may be provided access to these additional resources for a period of the event and prevent this access after the event is over.

If there is a shortfall detected in the available resources associated with the host machine 110, the QoS manager 167 may provide several options to handle the change in the QoS for the VM 170-1-N. In one implementation, the QoS manager 167 may determine that the available resources only allow for a portion of the change in the QoS. For example, there may be other processes running on the host machine 110 that may be adversely affected if the change in QoS for the VM 170-1-N is fully implemented. In such cases, the QoS manager 167 may instruct the hypervisor 160 to provide a portion of the available resources of the host machine 110 for the duration of the event.

In another example, the QoS manager 167 may instruct the hypervisor 160 to access resources from a second host machine to accommodate for the change in the QoS for the VM 170-1-N. For example, the hypervisor 160 may make a request for the second host machine to host the VM for a period of time corresponding to the duration of the event. In such cases, the second host machine may allow the hypervisor 160 to access the available resources. In one implementation, the hypervisor 160 may perform a migration of the relevant VM 170-1-N to a second hypervisor associated with the second host machine. This migration is performed in order for the second host machine to host the VM 170-1-N for the duration of the event. In alternative implementations, other examples are possible to provide resources to the VM 170-1-N to accommodate for the change in the QoS associated with the particular operational event.

Figure 2:
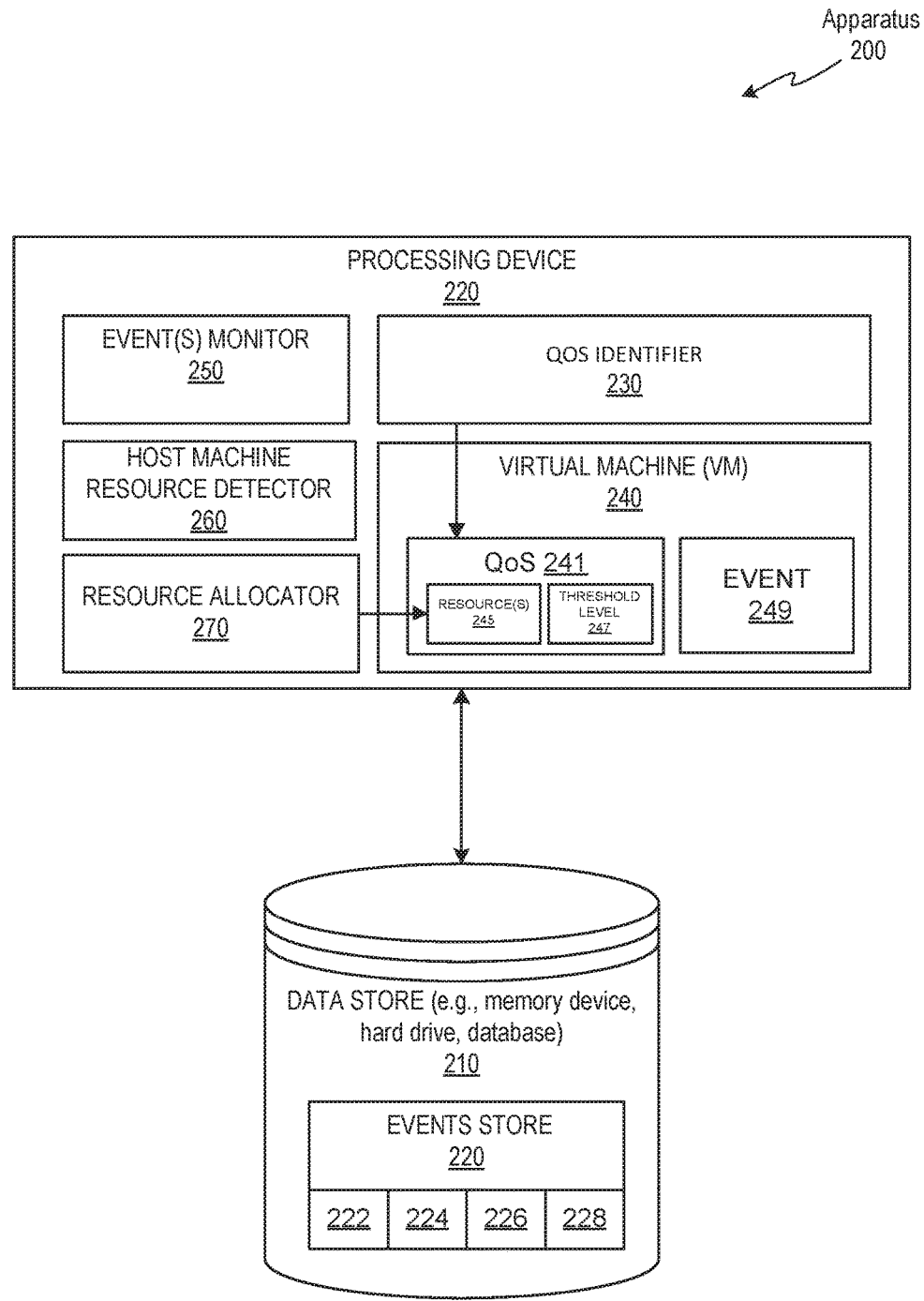
FIG. 2 illustrates an example apparatus to support quality-of-service for virtual machines based on operational events in which implementations of the disclosure may operate.

FIG. 2 illustrates an example apparatus 200 in which implementations of the disclosure may operate. The apparatus 200 may be the same or similar to the host machine 110 of FIG. 1, or other computing device(s) within the networked virtualization architecture 100 of FIG. 1. Apparatus 200 may include components and modules for supporting QoS for VMs based on operational events. The apparatus 200 may include a data store 210 and a processing device 220 coupled to the data store 210. In some implementations, the processing device 220 may execute instructions for carrying out the operations of the modules as discussed herein. As shown, these modules may include a QoS identifier 230 to identify a QoS 241 associated with a VM 240 being executed by the processing device 220, an events monitor 250, a host machine resource detector 260, and a resource allocator 270.

Data store 210 may include any non-persistent data storage (e.g., memory), persistent data storage (e.g., flash storage, hard drive, tape), other medium, or combination thereof that is capable of storing instructions for carrying out the operations of the components and module discussed herein. In some implementations, the data store 210 may store updatable list of various operational events and relevant information associated with those events in an events store 220. In implementations, the events store 220 may comprise a data structure (e.g., an array, tree, list or other types of data structures) that can comprise a number of entries. Each entry may contain a plurality of fields, such as event fields 222-228, that store relevant information regarding a particular event. Each entry may include, but not limited to, an identification code 222 for the event, a change field 224 indicating an estimated amount of change in the QoS for the event, a timing field 226 indicating an estimate time duration of the event, as well as other relevant fields 228, such as a user profile indicating a certain event associated with a subscription account of a user of the VM.

In some implementations, the apparatus 200 may update the data store 210 on a periodic basis as per a defined schedule. In one implementation, the apparatus 200 may update the events 220 in the data store 210 based on input for a user, such as a system administrator, via an interface (not shown). In other implementations, the apparatus 200 may update the events store 220 based on a previous occurrence of a particular event. For example, when one of the events in the events store 220 is detected, the apparatus 200 may record certain information, such as the time it takes for the event to complete, the amount of resources used in the event, and other relevant information regarding an execution of the event. This recorded information may be compared to the data in the event fields 222-228 and then updated to account for the latest information regarding the event.

The QoS identifier 230 can identify a QoS 241 associated with a particular VM, such as VM 240, running a host machine associated with the apparatus 200. This may be a VM 240 that is executed by the processing device 220 in accordance with the QoS 241. In that regard, the QoS 241 indicates an amount of resources (e.g., resource 245) of the host machine allocated to the VM 240. The QoS 241 may be based on a service level agreement or application subscription service associated with a user utilizing the VM 240.

The events monitor 250 can monitor the VM 240 for an occurrence of an operational event, such as event 249, to be executed at the VM. For example, events monitor 250 may determine whether the operational event 249 is to occur in view of an interaction with the VM 240. These interactions may include, for example, a user triggered event or a system triggered event. Based on the operational event 249, the monitor 250 may identify a change in the QoS 241 that is desired to ensure that the VM 240 is able to effectively perform during the event. For example, the events monitor 250 may identify the operational event 249 that is to occur from the events in the events store 220 stored in data store 210. Based on the entry fields 222-228 associated with the events store 220, the monitor 250 identifies an estimated amount of change in the QoS that is associated with the particular operational event.

Host machine resource detector 260 may determine whether the host machine associated with the apparatus 200 comprises available resources to accommodate for the change in the QoS 241 associated with the VM 240. For example, if the change in the QoS 241 is more than a threshold level 247 associated with the VM 240, the apparatus 200 may determine whether there are additional resources available to allocate to the VM 240 for the event. In this regard, the threshold level 247 indicates a maximum amount of resources to be used by the VM for it to maintain a substantially constant performance level. In order to locate the available resources, the host machine resource detector 260 may interface with an agent running on the host machine. For example, the agent, such as agent 165 of FIG. 1, may monitor the state of various resources on the host machine 110. Based on the information from the agent, the host machine resource detector 260 may make the determination as to whether there are additional resources that can be allocated to the VM.

The resource allocator 270 can adjust the resource 245 of QoS 241 associated with the VM 240 in view of the available resources of the host machine. For example, the resource allocator 270 may temporarily adjust (e.g., increase or decrease) the QoS 241 associated with the VM to accommodate for the change in the QoS. For example, the QoS 241 adjustments may be configured to last for the duration of the event. These adjustments to the resource 245 are based on the amount of additional resources that are available. For example, if there is a shortfall in the available resources, the resource allocator 270 may only provide a portion of the available resource to satisfy the change in the QoS 241 of the VM 240. In some cases, the resource allocator 270 may request access to resources from a second host machine or request that the VM 240 be migrated to the second machine to accommodate for the change in the QoS 241.

Figure 3:
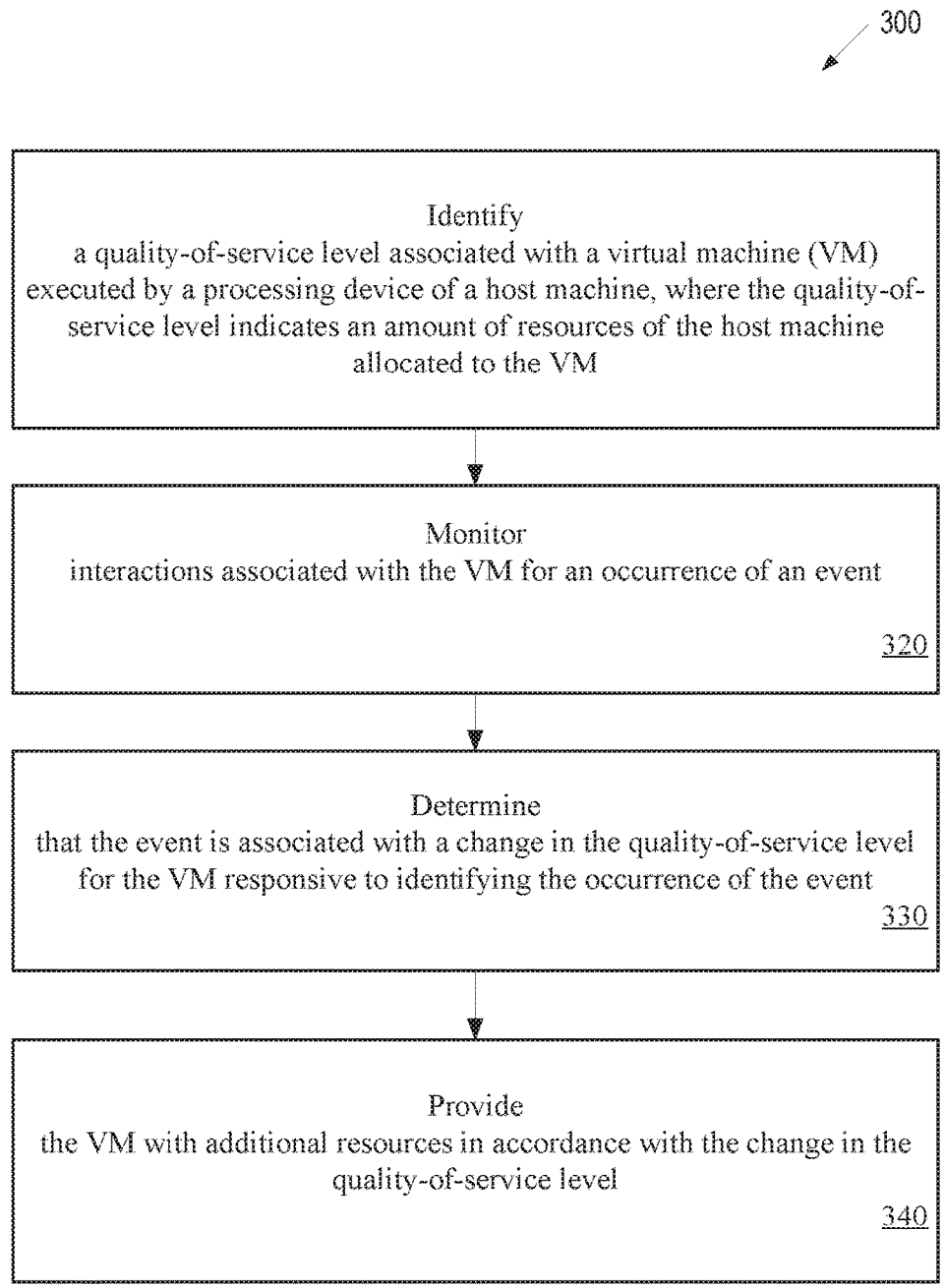
FIG. 3 depicts a flow diagram of a method for supporting quality-of-service for virtual machines based on operational events in accordance with one or more aspects of the disclosure.

FIG. 3 depicts a flow diagram of one implementation of a method 300 in accordance with one or more aspects of the disclosure. In one implementation, the processing device 220 of FIG. 2 may perform method 300 to support QoS for VMs based on operational events. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Method 300 being in block 310 where a quality-of-service level is identified as associated with a VM executed by a processing device of a host machine. The QoS indicates an amount of resources of the host machine allocated to the VM. Interactions associated with the VM are monitored for an occurrence of an event in block 320. In block 330, it is determined that the event is associated with a change in the QoS for the VM in response to identifying the occurrence of the event. In block 340, the VM is provided with additional resources in accordance with the change in the QoS.

Figure 4:
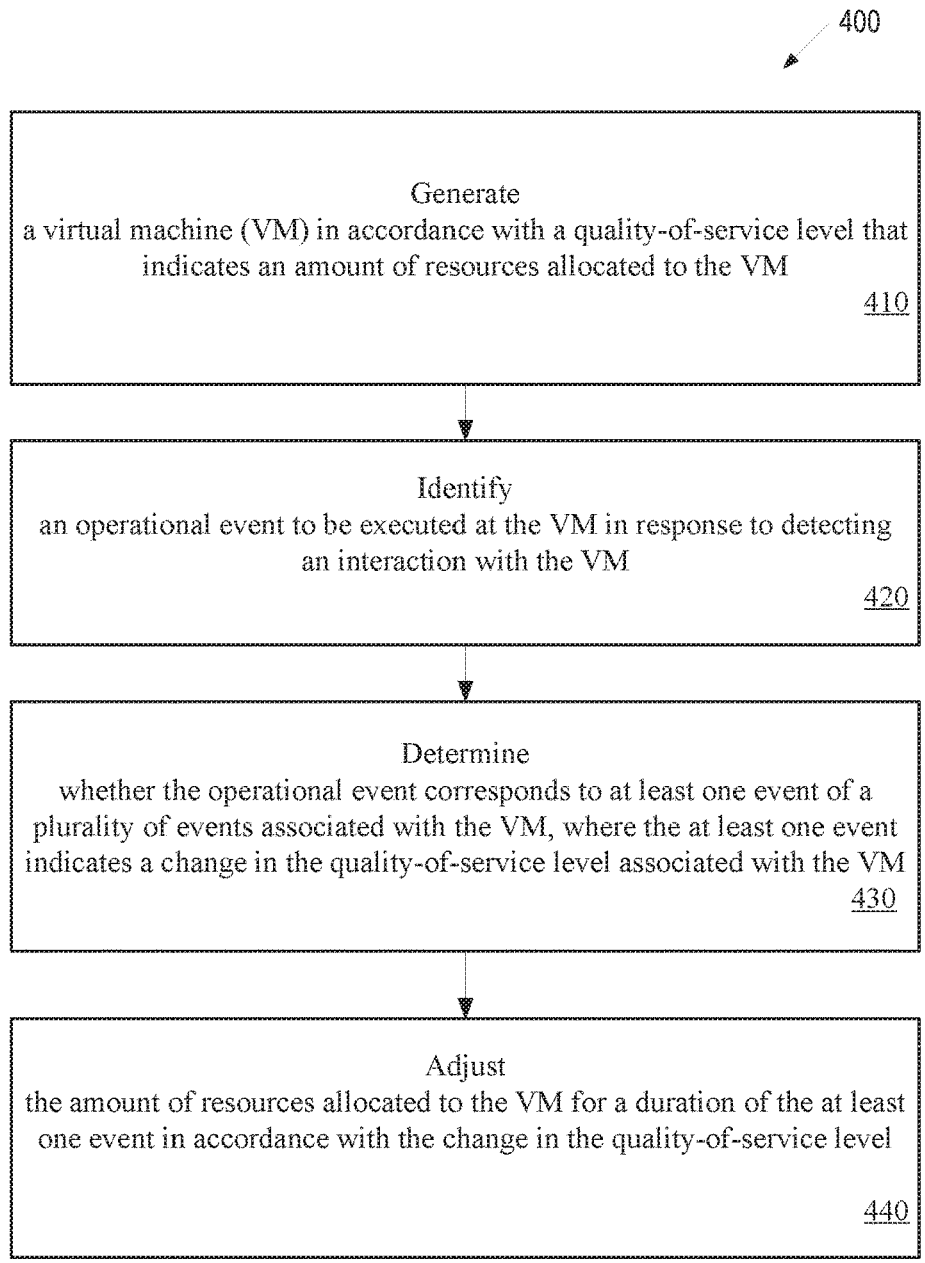
FIG. 4 depicts a flow diagram of another method supporting quality-of-service for virtual machines based on operational events in accordance with one or more aspects of the disclosure.

FIG. 4 depicts a flow diagram of one implementation of another method 400 in accordance with one or more aspects of the disclosure. In one implementation, the processing device 220 of FIG. 2 may perform method 400 to support quality-of-service for VMs based on operational events. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Method 400 being in block 410 where a VM is generated in accordance with a QoS. The QoS indicates an amount of resources allocated to the VM. An operational event to be executed at the VM is identified in response to detecting an interaction with the VM in block 420. In block 430, it is determined that the operational event corresponds to at least one event of a plurality of events associated with the VM. In this regard, the at least one event is associated with a change in the amount of resources to support the QoS of the VM. In block 440, the amount of resources allocated to the VM is adjusted for a duration of the at least one event in accordance with the change in the quality-of-service level.

Figure 5:
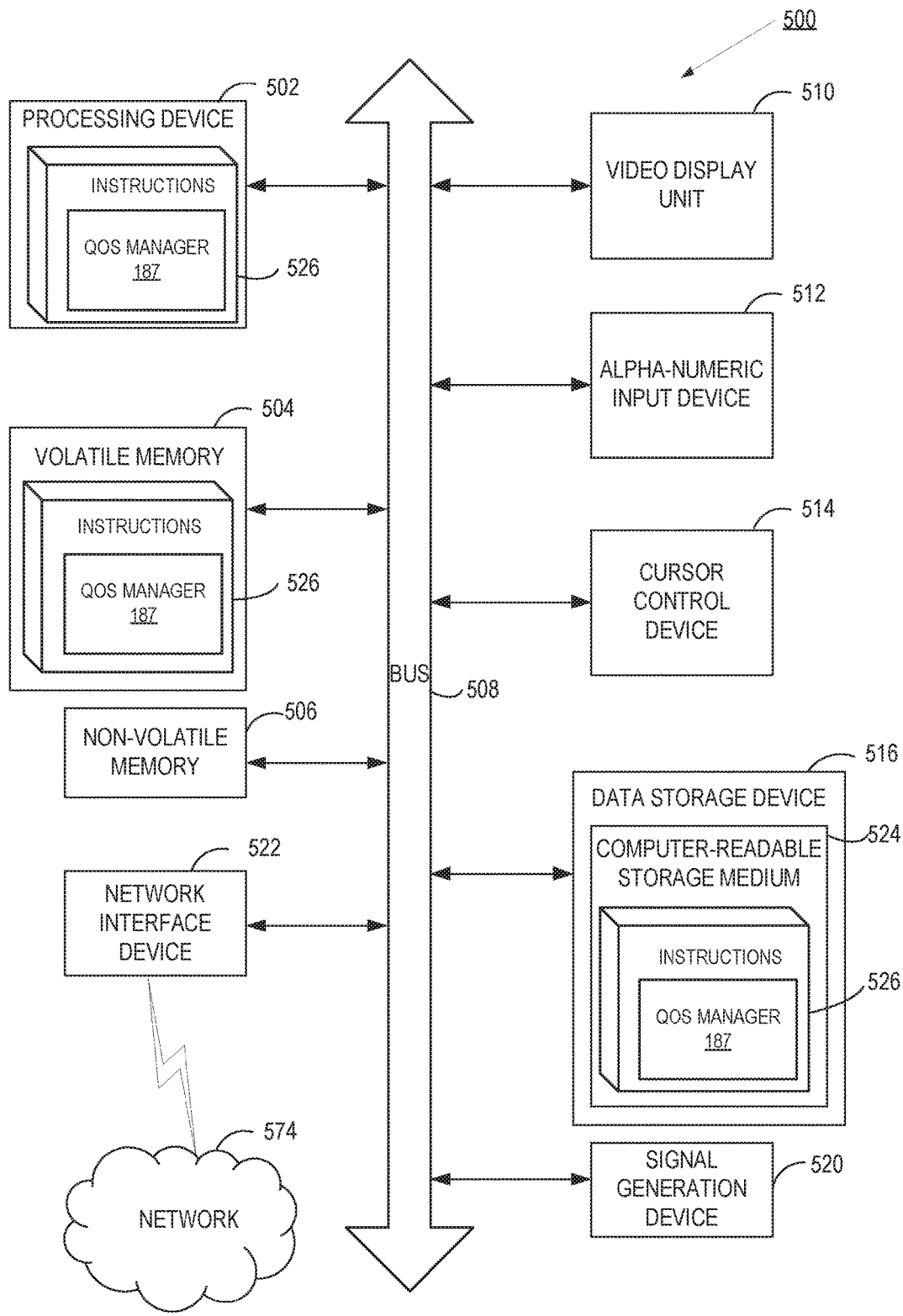
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to a computing device within system 100 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine/host device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting quality-of-service for virtual machines based on operational events.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage domain 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage domain 516 may include a non-transitory computer-readable storage medium 524 on which may store instructions 526 encoding any one or more of the methods or functions described herein, including instructions of the quality-of-service manager 187 for implementing method 300 of FIG. 3 or method 400 of FIG. 4 for supporting QoS for VMs based on operational events.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, firmware modules or functional circuitry within hardware devices may implement the methods, components, and features of the disclosure. Further, the methods, components, and features may be implemented in any combination of hardware devices and computer program components, or in computer programs.

Unless specifically stated otherwise, as apparent from the following discussion, it is appreciated that throughout the description, discussions utilizing terms such as "generating", "determining", "monitoring", "allocating", "providing", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying a quality-of-service level associated with a virtual machine (VM) hosted by a first host machine of a plurality of host machines that are coupled to and are managed by a host controller, wherein the quality-of-service level indicates an amount of resources of the first host machine allocated to the VM, and wherein a part of a quality-of-service manager is executed at the first host machine and another part of a quality-of-service manager is executed in the host controller;
   monitoring, by the quality-of-service manager, interactions with the VM that cause an occurrence of an event at the VM, wherein the event is in an updateable list of events and estimated quality-of-service changes for the corresponding events associated with a user account for the VM, wherein the interactions comprise at least initiating an application at the VM that utilizes resources in excess of the amount of resources allocated to the VM;
   determining, by the quality-of-service manager, an estimated amount of change in the quality-of-service level for the VM in accordance with the occurrence of the event and the updateable list;
   determining, by the quality-of-service manager, whether the first host machine comprises resources to satisfy the change in the quality-of-service level for a duration of the event;
   responsive to determining that the first host machine comprises the resources to satisfy the change, providing, by the quality-of-service manager, the VM with additional resources of the first host machine in accordance with the change in the quality-of-service level; and
   responsive to determining that first host machine does not comprise the resources to satisfy the change, migrating, by the quality-of-service manager, the VM to a second host machine of the plurality of host machines for the duration of the event.

2. The method of claim 1, further comprising:
   identifying, from the interactions, a time period in which the event is to occur; and
   providing access to the resources at the time period.

3. The method of claim 2, further comprises adjusting the quality-of-service level for the time period.

4. The method of claim 1, further comprising:
   identifying an event identifier associated with the event;
   identifying a user profile associated with the VM; and
   determining whether the event is at least one of a plurality of events associated with the VM in view of the event identifier and the user profile.

5. The method of claim 1, further comprising determining whether the change in the quality-of-service level meets a threshold level associated with the VM.

6. The method of claim 1, further comprising:
   determining whether the first host machine comprises available resources; and
   determining whether the change in the quality-of-service level is allowed in view of the available resources.

7. The method of claim 6, further comprising responsive to detecting that there is a shortfall in the available resources, providing access to resources from the second host machine to accommodate for the change in the quality-of-service level for the VM.

8. The method of claim 6, further comprising providing a request for the second host machine to host the VM for the duration of the event.

9. A non-transitory computer-readable storage medium comprising instructions that when executed, by a processing device, cause the processing device to:
   identify a quality-of-service level associated with a virtual machine (VM) hosted by a first host machine of a plurality of host machines that are coupled to and are managed by a host controller, wherein the quality-of-service level indicates an amount of resources of the first host machine allocated to the VM, and wherein a part of a quality-of-service manager is executed at the first host machine and another part of a quality-of-service manager is executed in the host controller;
   responsive to detecting an interaction with the VM, identify an operational event to be executed at the VM, wherein the event is in an updateable list of events and estimated quality-of-service changes for the corresponding events associated with a user account for the VM, wherein the interactions comprise initiating an application at the VM to utilize resources in excess of the amount of resources allocated to the VM;

determine whether the operational event corresponds to at least one event in the updateable list of events associated with the VM, wherein the at least one event to indicate an estimated amount of change in the quality-of-service level associated with the VM;

determine whether the first host machine comprises resources to satisfy the change in the quality-of-service level for a duration of the event;

responsive to determining that the first host machine comprises the resources to satisfy the change, adjust the amount of resources of the first host machine allocated to the VM for a duration of the at least one event in accordance with the change in the quality-of-service level; and responsive to determining that first host machine does not comprise the resources to satisfy the change, migrate the VM from the first host machine to a second host machine of the plurality of host machines for the duration of the event.

10. The non-transitory computer-readable storage medium of claim 9, wherein the processing device to adjust the amount of resources further comprises the processing device is further to decrease the amount of resources allocated to the VM.

11. The non-transitory computer-readable storage medium of claim 9, the processing device to adjust the amount of resources further comprise the processing device is further to increase the amount of resources allocated to the VM.

12. The non-transitory computer-readable storage medium of claim 10, wherein the processing device is further to:
identify a scheduled time in which the operational event is to occur; and
provide the increased amount of resources allocated to the VM at the scheduled time.

13. The non-transitory computer-readable storage medium of claim 9, wherein the processing device is to determine whether the change in the quality-of-service level meets a threshold level associated with the VM.

14. The non-transitory computer-readable storage medium of claim 9, wherein the processing device is further to:
determine an amount of available resources associated with the first host machine hosting the VM; and
determine whether the change in the amount of resources to support the quality-of-service level associated with the VM is allowed in view of the available resources.

15. An apparatus comprising:
a memory to store data related to a plurality of operational events; and
a processing device, operatively coupled to the memory, to:
identify a quality-of-service level associated with a virtual machine (VM) hosted by a first host machine of a plurality of host machines that are coupled to and are managed by a host controller, wherein the quality-of-service level indicates an amount of resources of a first host machine allocated to the VM, and wherein a part of a quality-of-service manager is executed in the first host machine and another part of a quality-of-service manager is executed in the host controller;

monitor interactions with the VM that cause an occurrence of an operational event to be executed at the VM, the operational event is associated with a change in the quality-of-service level, wherein the operational event is in an updateable list of events and estimated quality-of-service changes for the corresponding events associated with a user account for the VM, wherein the interactions comprise initiating an application at the VM to utilize resources in excess of the amount of resources allocated to the VM;

responsive to detecting the occurrence, determine whether the allocated resources associated with the VM to allow for an estimated amount of change in the quality-of-service level associated with the VM in accordance with the updateable list;

determine whether the first host machine comprises available resources to satisfy the change in the quality-of-service level for a duration of the event;

responsive to determining that the first host machine comprises the available resources to satisfy the change, adjust, for a duration of the operational event, the quality-of-service level associated with the VM in view of the available resources of the first host machine; and responsive to determining that the first host machine does not comprise the available resources to satisfy the change, migrate the VM from the first host machine to a second host machine of the plurality of host machines for the duration of the event.

16. The apparatus of claim 15, wherein the operational event is associated with a user interaction with the VM.

17. The apparatus of claim 15, wherein the operational event is a system event to occur at a schedule time.

18. The apparatus of claim 15, wherein the processing device to adjust quality-of-service level the processing device is further to increase an amount of bandwidth accessible by the VM to accommodate for the change in the quality-of-service level.

19. The apparatus of claim 15, wherein the processing device to adjust quality-of-service level the processing device is further to increase an amount of available memory accessible by the VM to accommodate for the change in the quality-of-service level.

20. The apparatus of claim 15, wherein the processing device is further to determine whether the change in the quality-of-service level meets a threshold level associated with the VM.

* * * * *